US012452588B2

(12) United States Patent
Kobayashi

(10) Patent No.: US 12,452,588 B2
(45) Date of Patent: Oct. 21, 2025

(54) CONVERSATION ASSISTING APPARATUS, CONVERSATION ASSISTING METHOD, NON-TRANSITORY COMPUTER-READABLE RECORDING MEDIUM

(71) Applicant: NTT, Inc.

(72) Inventor: Kazunori Kobayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 432 days.

(21) Appl. No.: 17/915,447

(22) PCT Filed: May 12, 2020

(86) PCT No.: PCT/JP2020/018909
§ 371 (c)(1),
(2) Date: Sep. 28, 2022

(87) PCT Pub. No.: WO2021/229670
PCT Pub. Date: Nov. 18, 2021

(65) Prior Publication Data
US 2023/0147802 A1 May 11, 2023

(51) Int. Cl.
*H04R 3/00* (2006.01)
*G10K 11/16* (2006.01)

(52) U.S. Cl.
CPC ............... *H04R 3/00* (2013.01); *G10K 11/16* (2013.01)

(58) Field of Classification Search
CPC ........ H04R 3/00; H04R 3/02; H04R 2499/13; G10K 11/16; G10K 9/12; G10K 11/24
USPC ........ 381/77, 78, 79, 86, 57, 66, 81–83, 123
See application file for complete search history.

(56) References Cited

U.S. PATENT DOCUMENTS

2022/0326332 A1* 10/2022 Kobayashi ............. G01H 3/125
2023/0368769 A1* 11/2023 Akiyama ......... G10K 11/17879

FOREIGN PATENT DOCUMENTS

JP H02111987 U 9/1990
JP 2006041743 A 2/2006
JP 2008207622 A 9/2008

OTHER PUBLICATIONS

Japanese Patent Application No. JP2022-522127, Office Action mailed Oct. 3, 2023, 8 pages.
NHK News Web "Medical examination of drive-through method begins" [online] Accessed on Apr. 28, 2020, website: https://www3.nhk.or.jp/lnews/nara/20200420/2050004243.html, with its English translation generated by computer.

* cited by examiner

*Primary Examiner* — Xu Mei

(57) ABSTRACT

A conversation assisting method of the present invention is performed in a first space in order to transmit an acoustic signal between the first space and a second space, separated by an isolation object, by using the isolation object. In the conversation assisting method of the present invention, a sound to be transmitted to the second space is emitted from the first space side to the isolation object at a predetermined intensity. Further, in the conversation assisting method of the present invention, a sound transmitted through the isolation object is picked up, and from the picked-up sound, a sound except for the emitted sound is emphasized and output.

16 Claims, 10 Drawing Sheets

CONVERSATION ASSISTING APPARATUS, CONVERSATION ASSISTING METHOD, NON-TRANSITORY COMPUTER-READABLE RECORDING MEDIUM

CROSS-REFERENCE TO RELATED APPLICATIONS

This application is a U.S. National Stage Application filed under 35 U.S.C. § 371 claiming priority to International Patent Application No. PCT/JP2020/018909, filed on 12 May 2020, the disclosure of which is hereby incorporated herein by reference in its entirety.

TECHNICAL FIELD

The present invention relates to a conversation assisting apparatus, a conversation assisting method, and a conversation assisting program for transmitting information by sound between two spaces separated by an isolation object.

BACKGROUND ART

As shown in Non-Patent Literature 1, there is a situation where, in a state of two spaces having been separated by an isolation object such as the body of an automobile, information transmission between the spaces is desired. Currently, information can be transmitted by: information transmission in which a transmitter/receiver such as a telephone or a transceiver is placed in each of both spaces, and a conversation is conducted; visual information transmission by writing or displaying characters on a tablet terminal; and information transmission by data communication using a tablet terminal. In sales of general drive-through type products, a person inside the car opens a window and speaks to a person outside the car or to a microphone to transmit information.

CITATION LIST

Non-Patent Literature

Non-Patent Literature 1: NHK NEWS WEB "Medical examination of drive-through method begins", [searched on Apr. 28, 2020], Internet <https://www3.nhk.or.jp/lnews/nara/20200420/2050004243.html>.

SUMMARY OF THE INVENTION

Technical Problem

However, the prior art has a problem that, when information is transmitted without opening a window of a vehicle, a device (e.g., a telephone or a tablet terminal) or a tool (e.g., a pen and paper for writing) is required in the vehicle, and when the window of the vehicle is opened, the state of separation into two spaces by the isolation object cannot be maintained.

The present invention has been made in view of such a situation, and it is an object of the present invention to provide a technique for transmitting information by sound while maintaining a state of separation into two spaces without having to place a device or a tool in one of the separated spaces.

Means for Solving the Problem

A conversation assisting method of the present invention is performed in a first space in order to transmit an acoustic signal between the first space and a second space, separated by an isolation object, by using the isolation object. In the conversation assisting method of the present invention, a sound to be transmitted to the second space is emitted from the first space side to the isolation object at a predetermined intensity. Further, in the conversation assisting method of the present invention, a sound transmitted through the isolation object is picked up, and from the picked-up sound, a sound except for the emitted sound is emphasized and output.

Effects of the Invention

According to the conversation assisting method of the present invention, it is possible to transmit information by sound while maintaining a state of separating the space into two spaces by an isolation object without having to place a device or a tool in one of the spaces.

DESCRIPTION OF EMBODIMENTS

Figure 1:
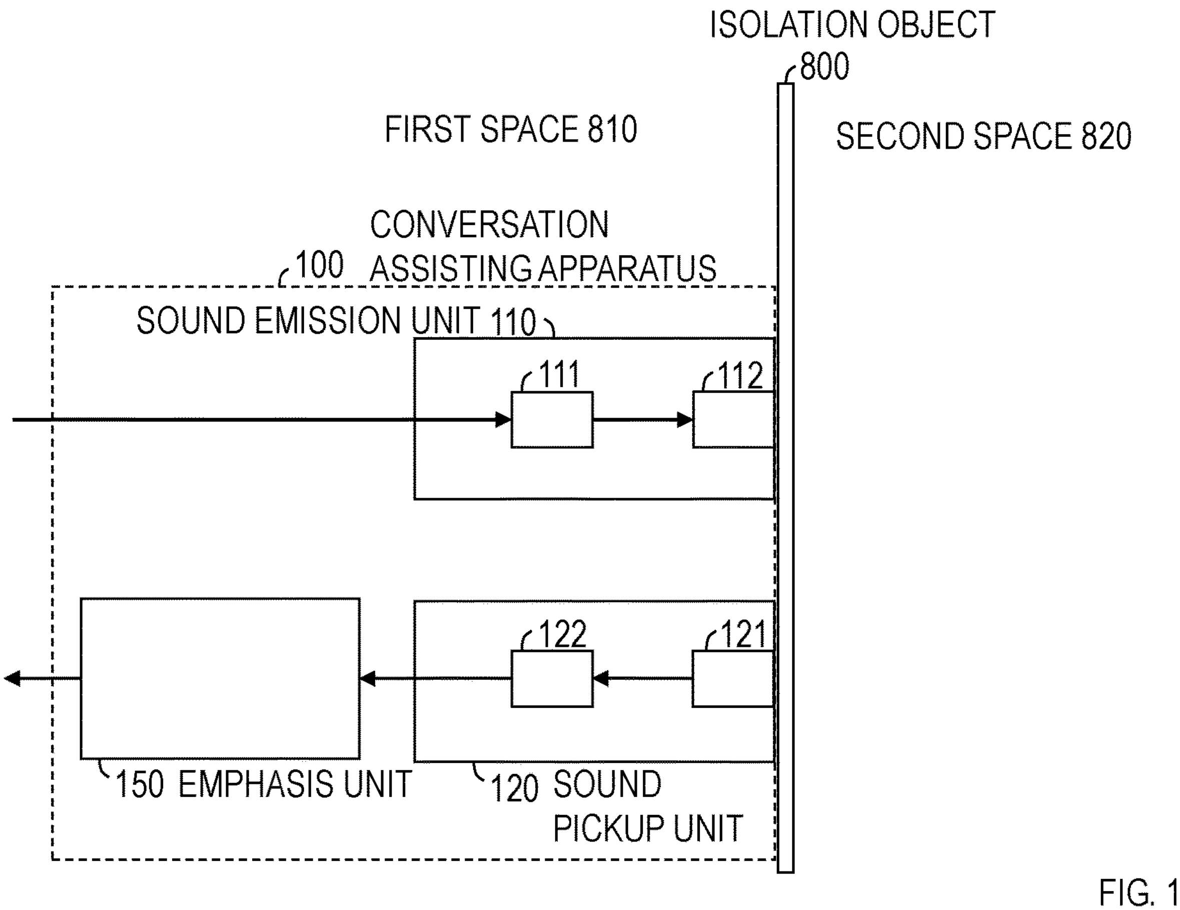
FIG. 1 is a diagram illustrating an example of a functional configuration of a conversation assisting apparatus according to a first embodiment.

Hereinafter, embodiments of the present invention will be described in detail. Note that components having the same function are denoted by the same reference numeral, and repeated description thereof will be omitted.

First Embodiment

Figure 2:
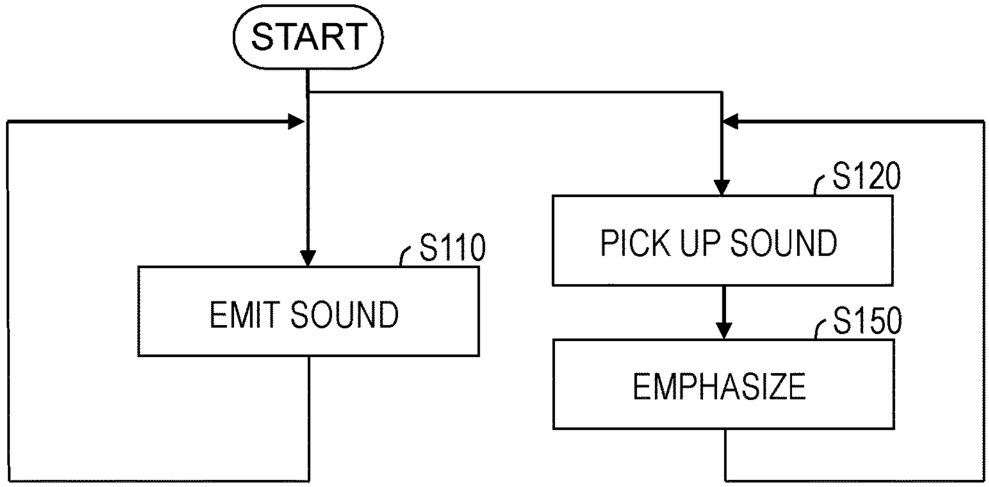
FIG. 2 is a diagram illustrating an example of a processing flow of a conversation assisting method according to the first embodiment.

FIG. 1 illustrates an example of a functional configuration of a conversation assisting apparatus according to a first embodiment, and FIG. 2 illustrates an example of a processing flow of a conversation assisting method according to the first embodiment. A conversation assisting apparatus 100 is placed in a first space 810 in order to transmit an acoustic signal between the first space 810 and a second space 820, separated by an isolation object 800, by using the isolation object 800. A conversation assisting method is performed in the first space in order to transmit an acoustic signal between the first space 810 and the second space 820, separated by an isolation object 800, by using the isolation object 800. The conversation assisting apparatus 100 includes a sound emission unit 110, a sound pickup unit 120, and an emphasis unit 150. The isolation object 800 is, for example, a vehicle, the first space 810 is a space outside the vehicle, and the second space 820 is a space inside the vehicle. In the case of a vehicle, the conversation assisting apparatus 100 may be pressed against a window glass or may be pressed against a vehicle body.

A sound to be transmitted to the second space is input to the conversation assisting apparatus 100. The sound emission unit 110 transmits the sound, to be transmitted to the second space, from the first space 810 side to the isolation object 800 at a predetermined intensity (S110). The sound emission unit 110 includes an amplification means 111 for causing the sound, to be transmitted to the second space 820, to a predetermined intensity, and a vibration means 112 for vibrating the isolation object 800. The vibration means 112 may be an actuator, an exciter, or a speaker. Although conversation is assumed in the present invention, the "sound to be transmitted to the second space" may include a sound such as a chime and a sound such as a musical instrument sound, as well as a vibration derived from voice.

The sound pickup unit 120 picks up a sound propagating through the isolation object 800 (S120). The sound pickup unit 120 includes a pickup means 121 for picking up the vibration of the isolation object 800 and an amplification means 122 for amplifying the picked-up sound. As the pickup means 121, a vibration pickup, a microphone, or an acceleration sensor may be used.

The emphasis unit 150 emphasizes and outputs a sound from the picked-up sound except for the sound transmitted (the sound emitted) by the sound emission unit 110 (S150). As a method for emphasizing the sound except for the sound transmitted (the sound emitted) by the sound emission unit 110, a technique described in second and subsequent embodiments may be used.

For example, in a state where a doctor is outside the vehicle and a patient is in the vehicle, the doctor wears a headset with a headphone and a microphone, and a medical staff member carries the conversation assisting apparatus 100. When the doctor and the patient talk, the medical staff member presses the conversation assisting apparatus 100 against the window glass of the vehicle so that the doctor outside the vehicle can talk with the patient inside the vehicle. When the conversation assisting apparatus 100 is used in this manner, the outside of the vehicle is the first space, and the inside of the vehicle is the second space. On the other hand, when the patient is outside the vehicle and the doctor is inside the vehicle, the inside of the vehicle may be defined as the first space and the outside of the vehicle as the second space.

It need not be a person that performs, in the first space, information transmission to and from the patient in the second space. A predetermined question may be recorded, the recorded question may be previously transmitted from the first space, and an answer from the second space may be recorded by voice recognition. Performing such a process enables the doctor to concentrate on the process of making a decision.

Further, the sound emission unit 110 and the sound pickup unit 120 may be formed as separate housings, and positions where these units are pressed against the isolation object 800 may be changed, thereby making it less likely to pick up the sound transmitted (the sound emitted) by the sound emission unit 110. For example, the sound emission unit 110 may be pressed against the side window, and the sound pickup unit 120 may be pressed against the front window.

According to the conversation assisting apparatus and the conversation assisting method of the first embodiment, it is possible to transmit information by sound while maintaining the state of separating the space into two by the isolation object 800 without having to place a device or a tool in one of the spaces.

Second Embodiment

Figure 3:
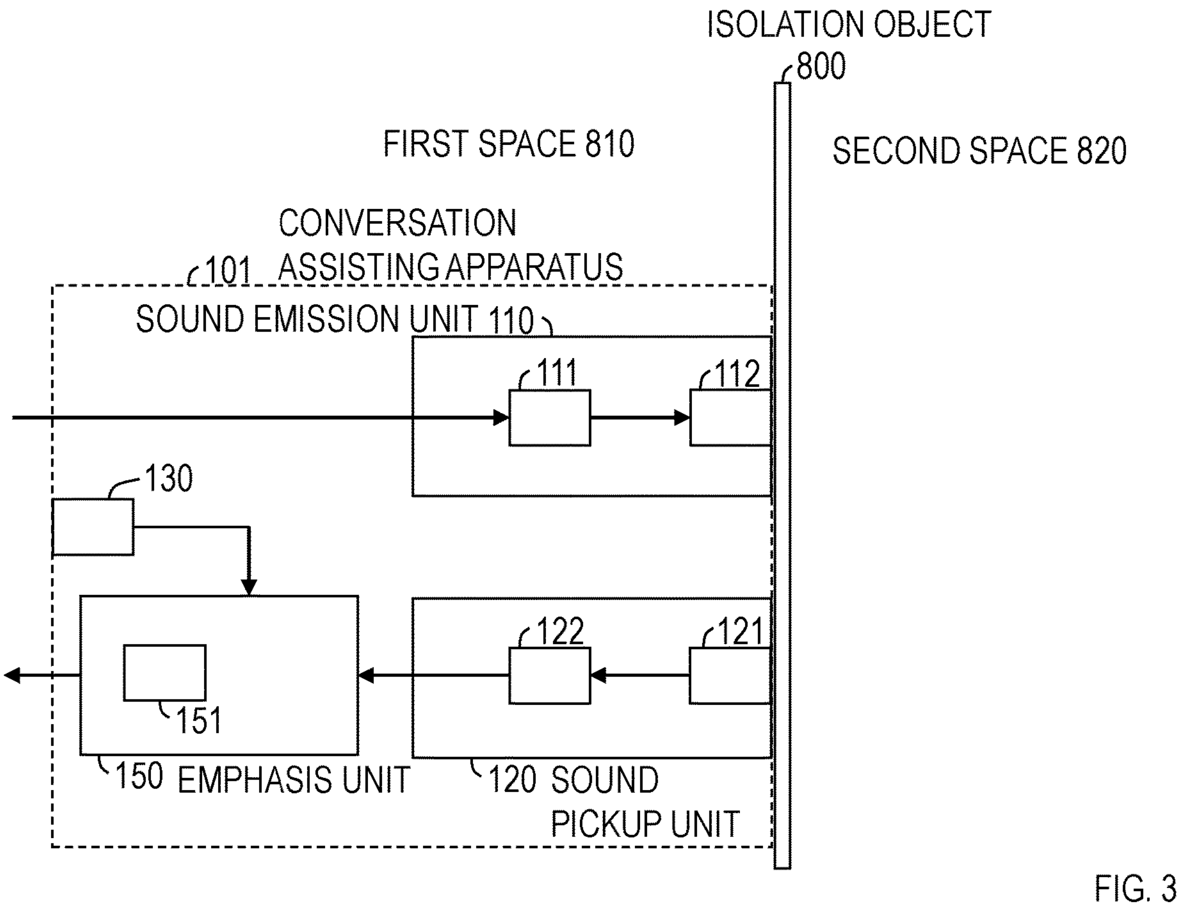
FIG. 3 is a diagram illustrating an example of a functional configuration of a conversation assisting apparatus according to a second embodiment.
Figure 4:
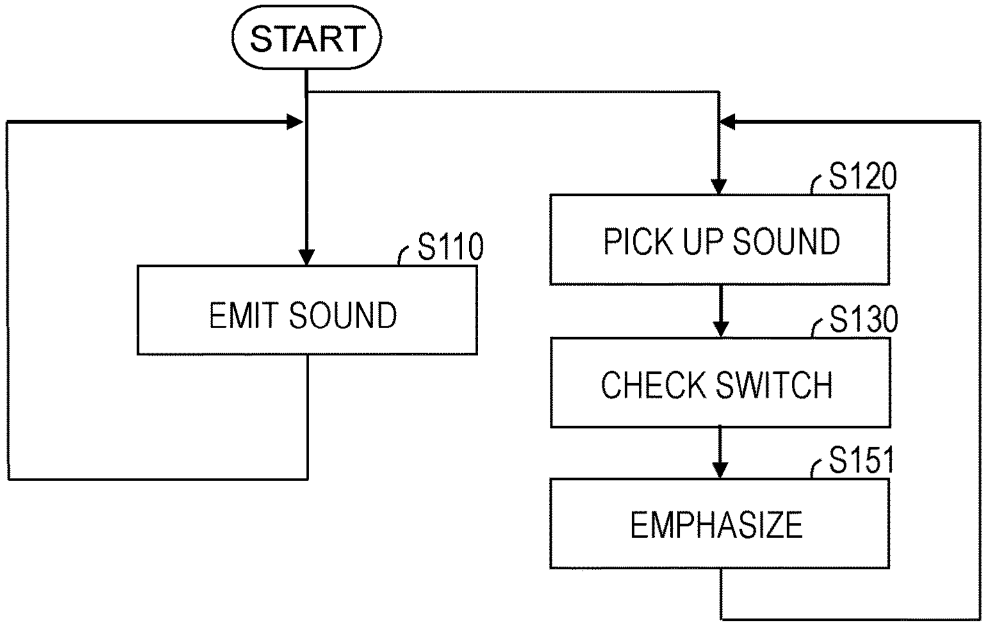
FIG. 4 is a diagram illustrating an example of a processing flow of a conversation assisting method according to the second embodiment.

FIG. 3 illustrates an example of a functional configuration of a conversation assisting apparatus according to a second embodiment, and FIG. 4 illustrates an example of a processing flow of a conversation assisting method according to the second embodiment. A conversation assisting apparatus 101 differs from the conversation assisting apparatus 100 in that a switch 130 is provided and that the emphasis unit 150 includes a blocking means 151. The emphasis unit 150 controls the intensity of the sound output from the emphasis unit 150 in accordance with the state of the switch 130 (S130, S151). Specifically, when the switch 130 indicates a state in which sound is transmitted to the second space, the sound output from the emphasis unit 150 is blocked by the blocking means 151. Therefore, when the sound is being transmitted from the first space 810 to the second space 820, the output from the emphasis unit 150 is blocked. As described above, preventing the output of the sound emitted from the emphasis unit 150 also corresponds to "emphasizing and outputting a sound from the picked-up sound except for the sound transmitted (the sound emitted) from the sound emission unit 110". The same applies to the following embodiments. Further, when the switch 130 does not indicate a state in which sound is transmitted to the second space, the blocking means 151 is not operated, and hence the sound of the second space can be output from the emphasis unit 150. Further, the same effects as those of the first embodiment can be obtained. Note that the state of the switch 130 may be switched by an operator in the first space.

Modification 1

Figure 5:
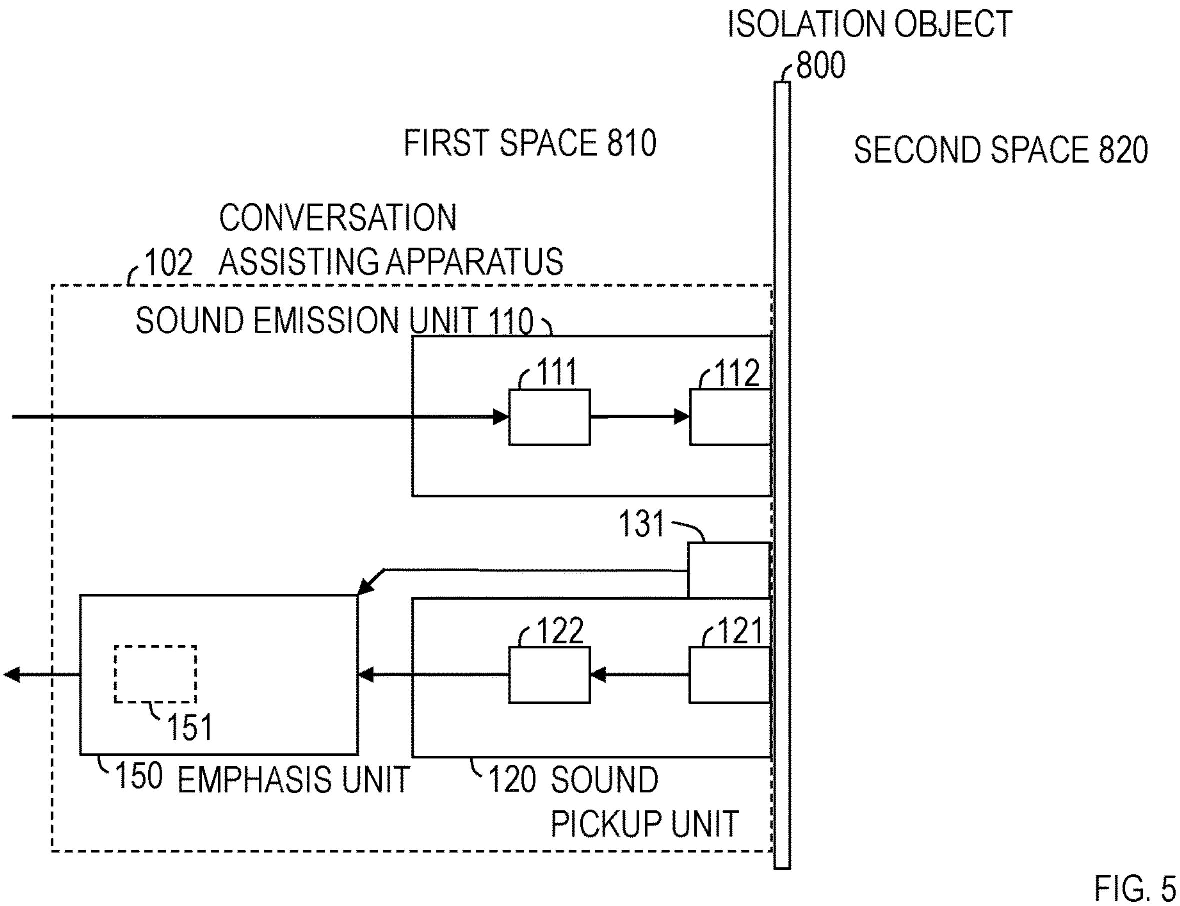
FIG. 5 is a diagram illustrating an example of a functional configuration of a conversation assisting apparatus according to Modification 1 of the second embodiment and Modification 2 of the second embodiment.
Figure 6:
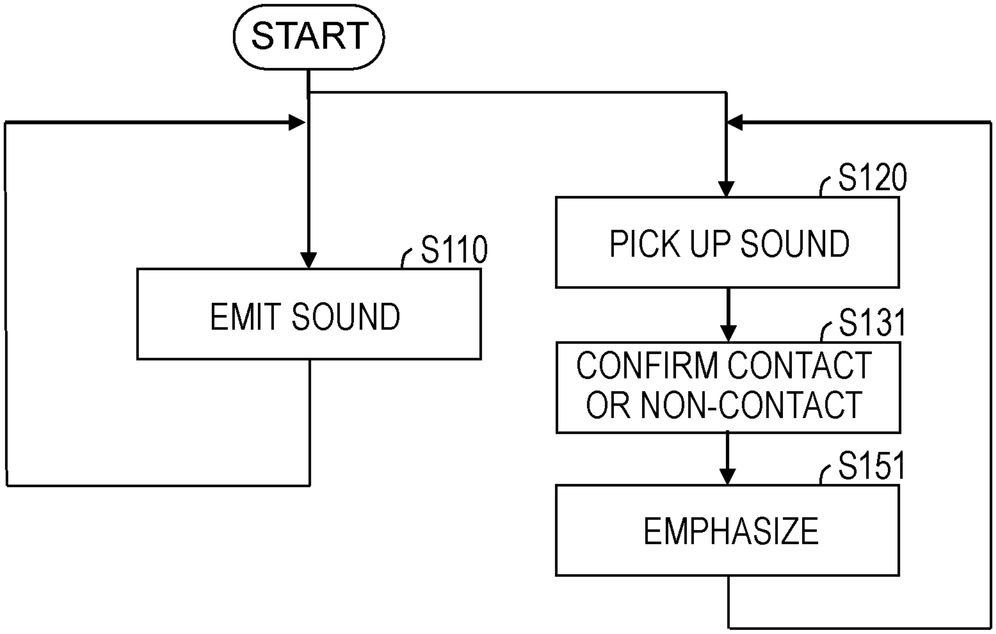
FIG. 6 is a diagram illustrating an example of a processing flow of a conversation assisting method according to Modification 1 of the second embodiment.

FIG. 5 illustrates an example of a functional configuration of a conversation assisting apparatus according to Modification 1 of the second embodiment, and FIG. 6 illustrates an example of a processing flow of a conversation assisting method according to Modification 1 of the second embodiment. A conversation assisting apparatus 102 also includes a sensor 131 that detects the contact of the sound pickup unit 120 with the isolation object 800. The intensity of the sound output from the emphasis unit 150 is controlled in accordance with the contact or non-contact with the isolation object 800 detected by the sensor 131. The emphasis unit 150 includes the blocking means 151. In the processing flow of the conversation assisting method illustrated in FIG. 6, the sensor 131 confirms the contact or non-contact (S131). When no contact has been made, the emphasis unit 150 blocks the sound output from the emphasis unit 150 by the blocking means 151, and when the contact has been made, the emphasis unit 150 outputs the sound in the second space without operating the blocking means 151 (S151). Therefore, the sound generated when the conversation assisting apparatus 102 is pressed against the isolation object 800 can be prevented from being output from the emphasis unit 150.

Modification 2

Figure 7:
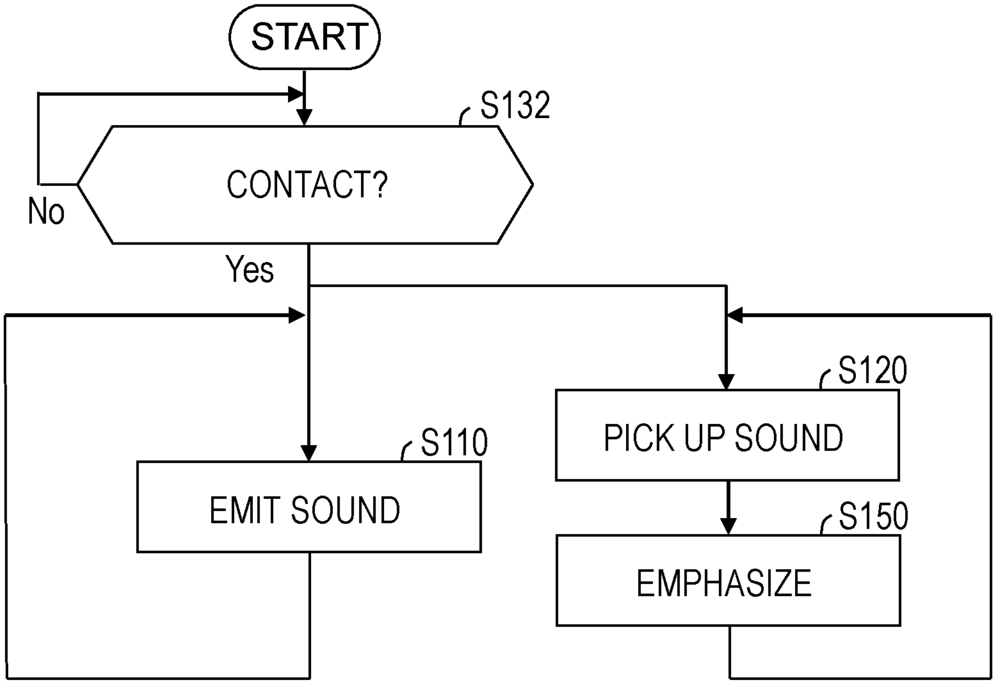
FIG. 7 is a diagram illustrating an example of a processing flow of a conversation assisting method according to Modification 2 of the second embodiment.

FIG. 5 illustrates an example of a functional configuration of a conversation assisting apparatus according to Modification 2 of the second embodiment, and FIG. 7 illustrates an example of a processing flow of a conversation assisting method according to Modification 2 of the second embodiment. As in Modification 1, the conversation assisting apparatus 102 also includes the sensor 131 that detects contact of the sound pickup unit 120 with the isolation object 800. The intensity of the sound output from the emphasis unit 150 is controlled in accordance with the contact or non-contact with the isolation object 800 detected by the sensor 131. However, the emphasis unit 150 does not include the blocking means 151. The conversation assisting apparatus 102 does not perform the processing of the sound emission unit 110, the sound pickup unit 120, and the emphasis unit 150 until the sensor 131 confirms the contact (S132). Therefore, the sound generated when the conversation assisting apparatus 102 is pressed against the isolation object 800 can be prevented from being output from the emphasis unit 150.

Third Embodiment

Figure 8:
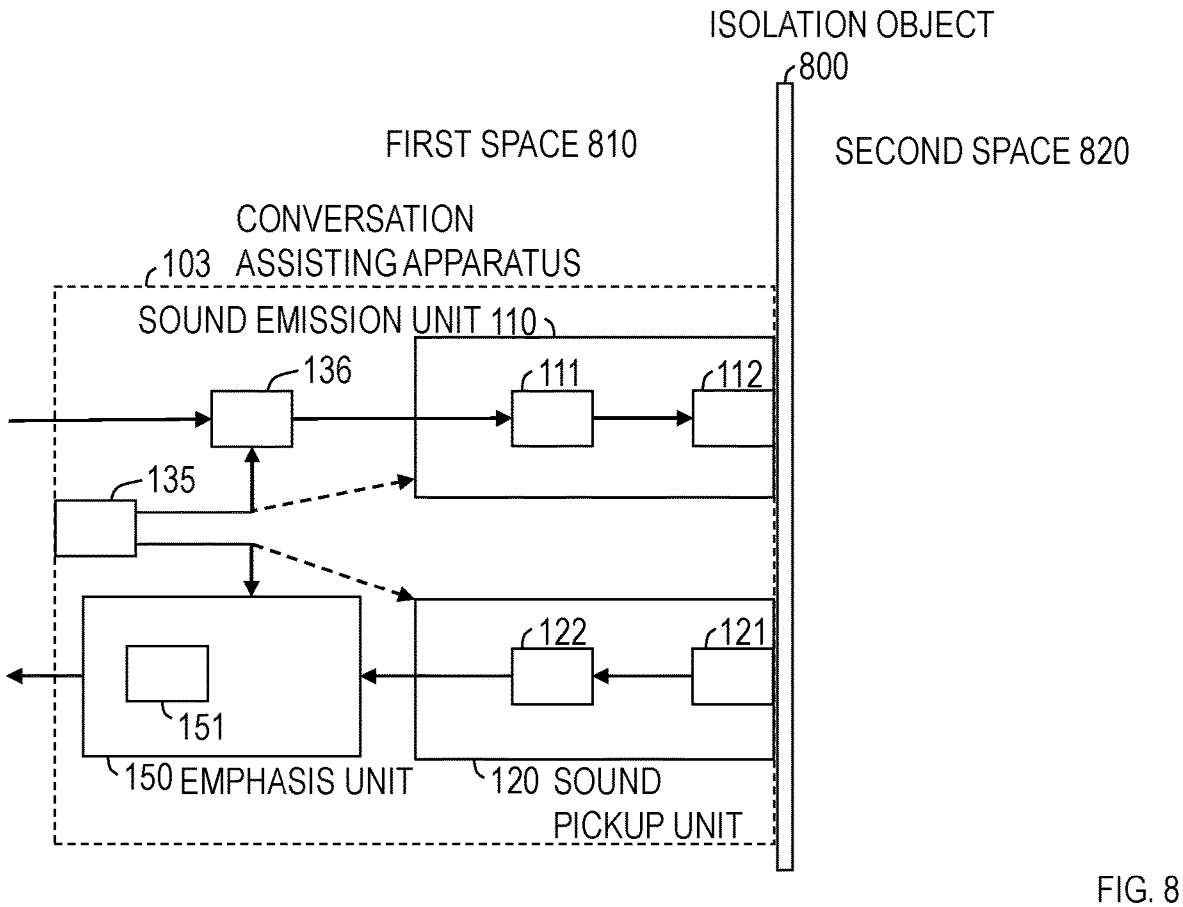
FIG. 8 is a diagram illustrating an example of a functional configuration of a conversation assisting apparatus according to a third embodiment.
Figure 9:
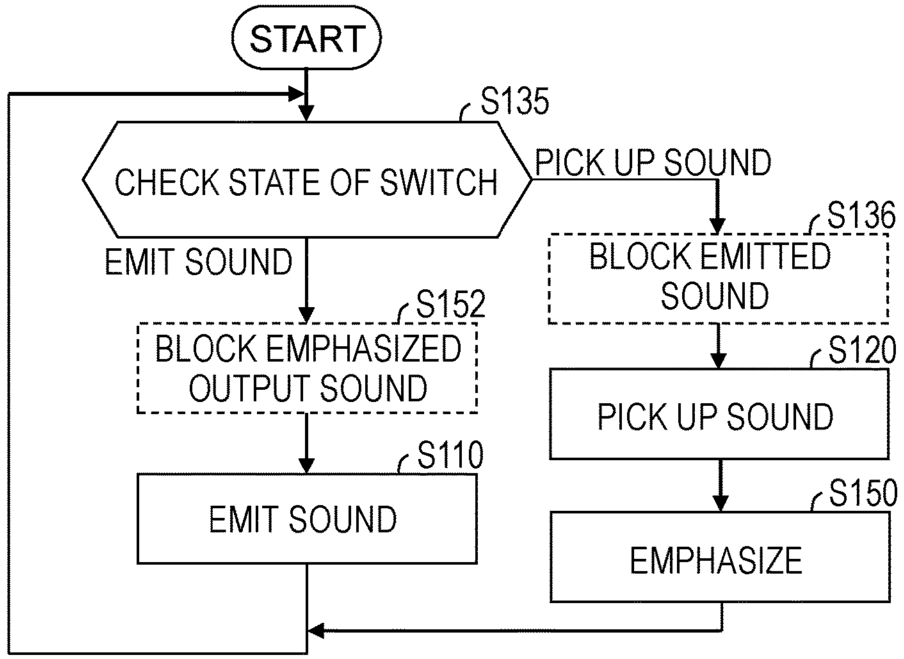
FIG. 9 is a diagram illustrating an example of a processing flow of a conversation assisting method according to the third embodiment.

FIG. 8 illustrates an example of a functional configuration of a conversation assisting apparatus according to a third embodiment, and FIG. 9 illustrates an example of a processing flow of a conversation assisting method according to the third embodiment. A conversation assisting apparatus 103 differs from the conversation assisting apparatus 100 in that a switch 135 and a blocking unit 136 are provided and that the emphasis unit 150 includes a blocking means 151. The state of the switch 135 is switched by the operator in the first space. The conversation assisting apparatus 103 switches between stopping the sound emission from the sound emission unit 110 and stopping the output of the emphasis unit 150 by switching the switch 135.

More specifically, the conversation assisting apparatus 103 checks the state of the switch 135 (S135). When the state of the switch 135 indicates sound emission, the emphasis unit 150 blocks the output sound by the blocking means 151 (S152). Then, the sound emission unit 110 emits a sound to be transmitted to the second space 820 (S110). When the state of the switch 135 indicates sound pickup, the blocking unit 136 blocks the sound to be transmitted to the second space 820 (S136). Then, the sound pickup unit 120 and the emphasis unit 150 operate. Thus, when transmitting the sound from the first space 810 to the second space 820, the conversation assisting apparatus 103 blocks the output from the emphasis unit 150. When the state of the switch 135 indicates sound pickup, the conversation assisting apparatus 103 can output the sound in the second space from the emphasis unit 150.

Note that the operation of the sound emission unit 110 or the sound pickup unit 120 may be controlled in accordance with the state of the switch 135 instead of providing the blocking means 151 and the blocking unit 136. For example, when the state of the switch 135 indicates sound emission, the output of the emphasis unit 150 is stopped. Specifically, the operation of the sound pickup unit 120 or the emphasis unit 150 may be stopped. Then, the sound emission unit 110 emits a sound to be transmitted to the second space 820 (S110). When the state of the switch 135 indicates sound pickup, the sound emission unit 110 is not operated. Then, the sound pickup unit 120 and the emphasis unit 150 operate. In this case as well, when transmitting the sound from the first space 810 to the second space 820, the conversation assisting apparatus 103 stops the output from the emphasis unit 150. When the state of the switch 135 indicates sound pickup, the conversation assisting apparatus 103 can output the sound in the second space from the emphasis unit 150. Further, the same effects as those of the first embodiment can be obtained.

Modification 1

Figure 10:
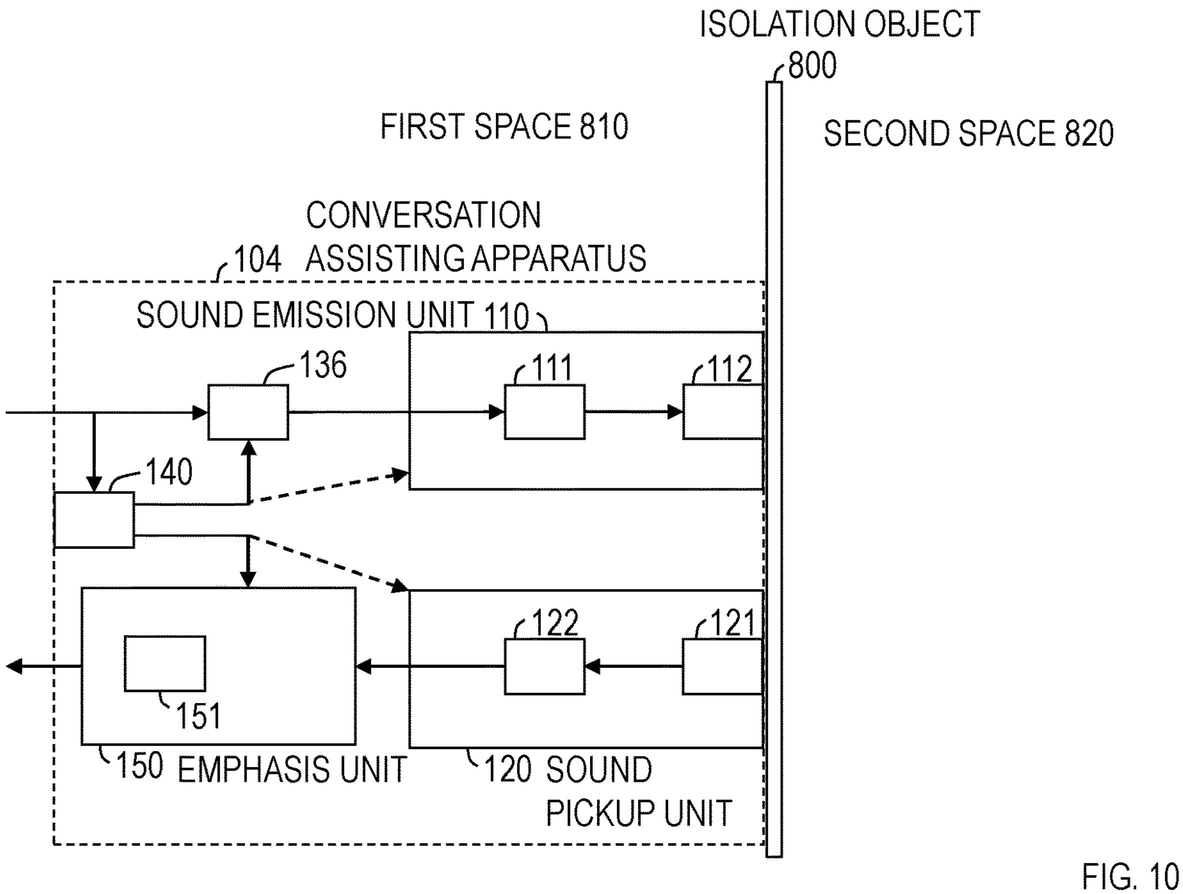
FIG. 10 is a diagram illustrating an example of a functional configuration of a conversation assisting apparatus according to Modification 1 of the third embodiment.
Figure 11:
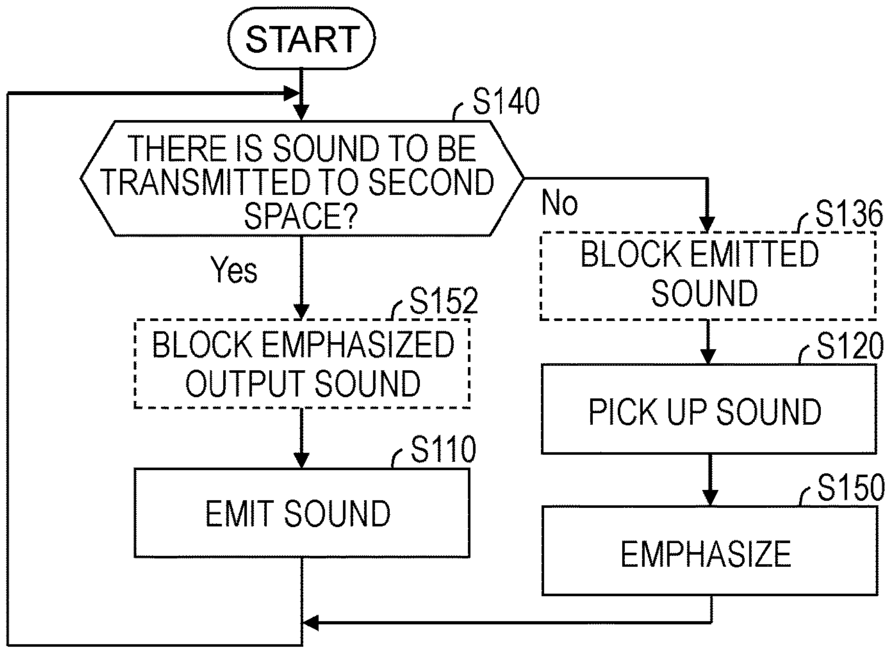
FIG. 11 is a diagram illustrating an example of a processing flow of a conversation assisting method according to Modification 1 of the third embodiment.

FIG. 10 illustrates an example of a functional configuration of a conversation assisting apparatus according to Modification 1 of the third embodiment, and FIG. 11 illustrates an example of a processing flow of a conversation assisting method according to Modification 1 of the third embodiment. A conversation assisting apparatus 104 differs from the conversation assisting apparatus 100 in that an utterance detection unit 140 and a blocking unit 136 are provided and that the emphasis unit 150 includes a blocking means 151. The conversation assisting apparatus 104 differs from the conversation assisting apparatus 103 in that the utterance detection unit 140 is provided instead of the switch 135. The state of the switch 135 has been switched by the operator. The utterance detection unit 140 automatically detects whether or not a sound to be transmitted to the second space 820 has been input (S140). When it is determined that there is a sound to be transmitted to the second space 820, the conversation assisting apparatus 104 stops the output from the emphasis unit 150 and emits the sound to be transmitted to the second space 820 from the first space side to the isolation object with a predetermined intensity (S110). As a method for stopping the output from the emphasis unit 150, the picking-up of sound propagating through the isolation object 800 may be stopped, or the operation of the emphasis unit 150 may be stopped. When it is determined that there is no sound to be transmitted to the second space 820, the conversation assisting apparatus 104 stops emitting the sound to the isolation object 800 and picks up the sound propagating through the isolation object 800 (S120). Then, the emphasis unit 150 outputs the sound of the second space 820 (S150).

As a method for stopping the output from the emphasis unit 150, the conversation assisting apparatus 104 may block the output from the emphasis unit 150 by the blocking means 151 of the emphasis unit 150 (S152). Instead of stopping the sound emission, the conversation assisting apparatus 104 may block the sound input by the blocking unit 136 (a noise not determined to be the sound to be transmitted to the second space 820) (S136).

When transmitting the sound from the first space 810 to the second space 820, the conversation assisting apparatus 104 can stop the output from the emphasis unit 150. When not transmitting the sound from the first space 810 to the second space 820, the conversation assisting apparatus 104 can output the sound of the second space from the emphasis unit 150.

Fourth Embodiment

Figure 12:
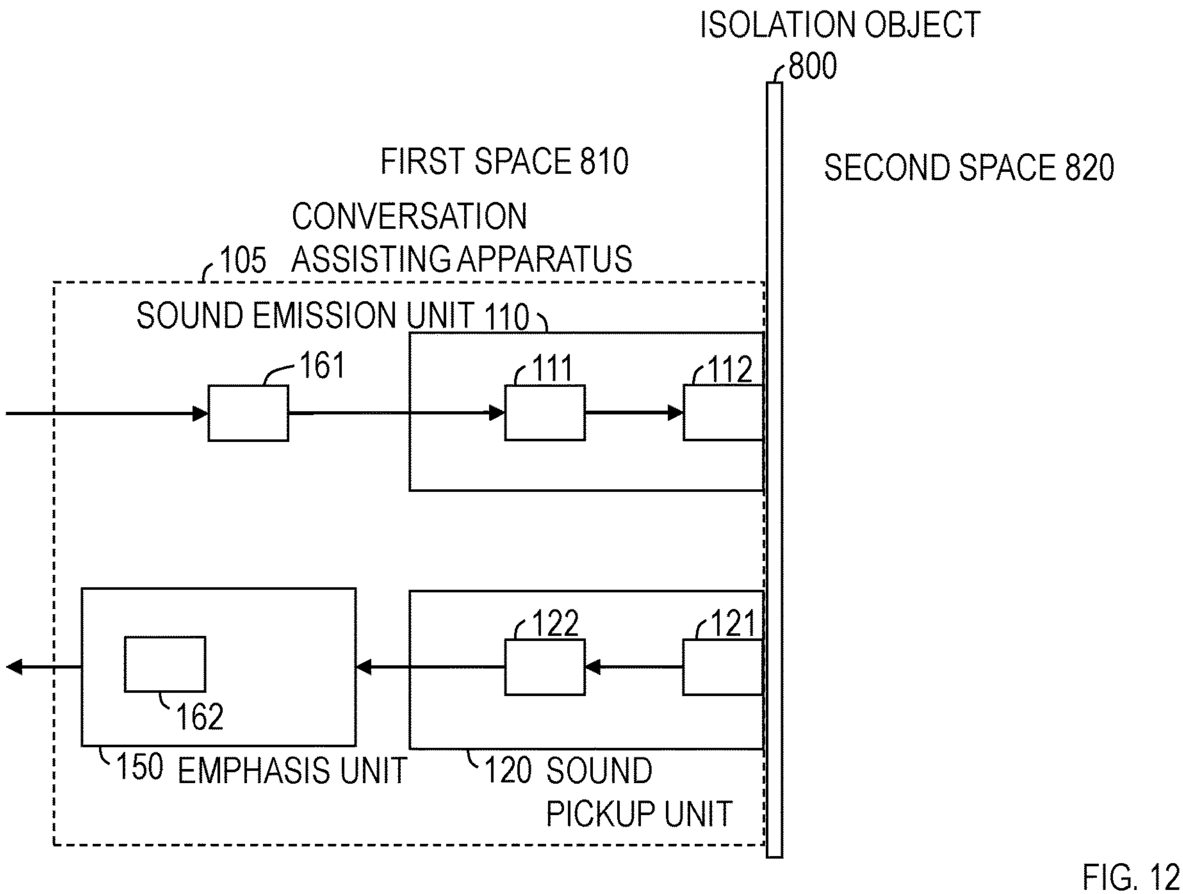
FIG. 12 is a diagram illustrating an example of a functional configuration of a conversation assisting apparatus according to a fourth embodiment.
Figure 13:
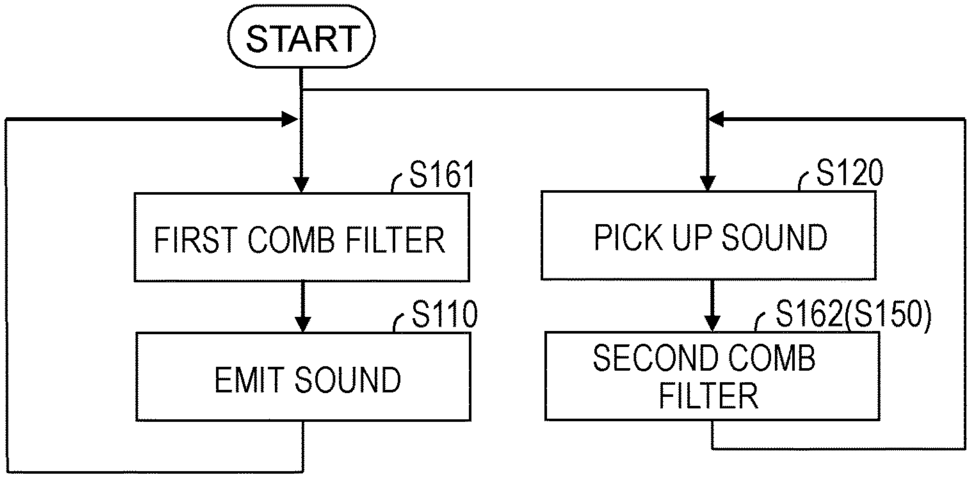
FIG. 13 is a diagram illustrating an example of a processing flow of a conversation assisting method according to the fourth embodiment.
Figure 14:
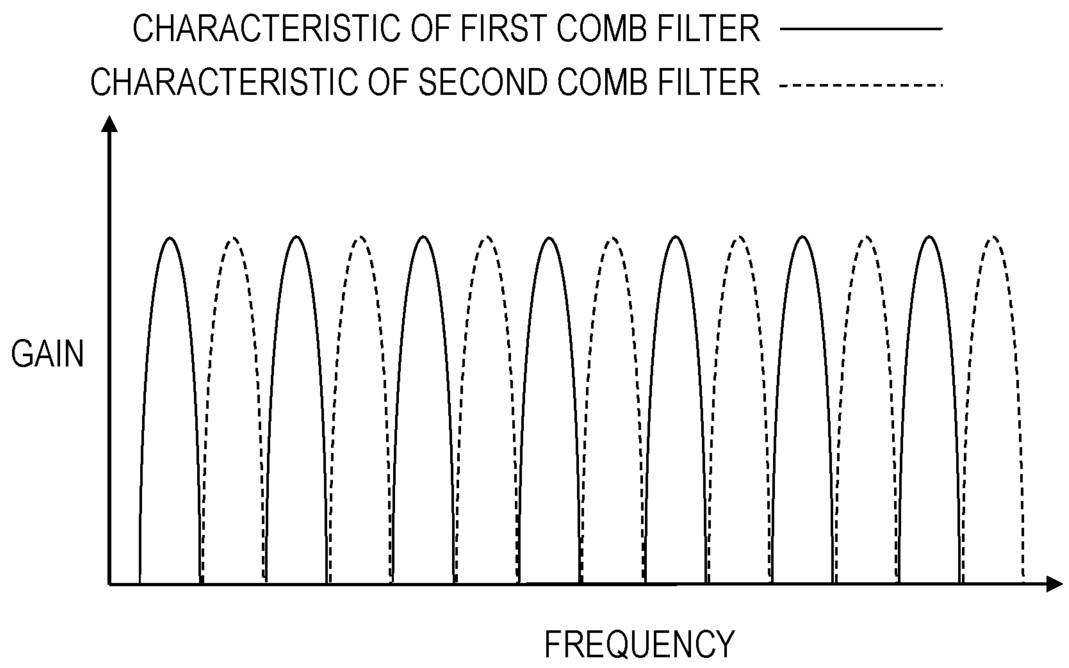
FIG. 14 is a graph illustrating frequency characteristics of a first comb filter and a second comb filter.

FIG. 12 illustrates an example of a functional configuration of a conversation assisting apparatus according to a fourth embodiment, and FIG. 13 illustrates an example of a processing flow of a conversation assisting method according to the fourth embodiment. A conversation assisting apparatus 105 differs from the conversation assisting apparatus 100 in that a first comb filter 161 is provided and that the emphasis unit 150 includes a second comb filter 162. FIG. 14 illustrates the frequency characteristics of the first comb filter and the second comb filter. The horizontal axis represents frequency, and the vertical axis represents gain. The solid line indicates an example of the characteristic of the first comb filter, and the dotted line indicates an example of the characteristic of the second comb filter. The comb filter may be achieved by a finite impulse response filter (FIR filter) or an infinite impulse response filter (IIR filter). After the short-time Fourier transform, multiplication by the frequency characteristic of the comb filter may be performed, and then the short-time inverse Fourier transform may be performed. As illustrated in FIG. 14, a passband of the second comb filter is a stopband of the first comb filter. The bandwidth of each of the passband and stopband may be set between 10 Hz and 200 Hz. For example, the passbands and the stopbands may be formed alternately at intervals of 50 Hz.

A sound to be transmitted to the second space 820, which has been input to the conversation assisting apparatus 105, passes through the first comb filter 161 (S161), and the sound emission unit 110 emits the sound to the isolation object 800 at a predetermined intensity (S110). The emphasis unit 150 allows the output from the sound pickup unit 120 to pass through the second comb filter 162 (S162). As described above, the passband of the second comb filter is the stopband of the first comb filter. Since the emitted sound does not include the frequency component of the stopband of the first comb filter, a sound that passes through the second comb filter is a sound except for the emitted sound. That is, allowing the passage through the second comb filter 162 leads to emphasizing the sound except for the emitted sound.

A vibration derived from voice includes various frequency components, so that even when the vibration is allowed to pass through the comb filter, the content can be heard. In the case of getting an artificial sound, such as a chime, included in the sound to be transmitted to the second space 820, a way may be devised to get various frequency components included. The characteristics are set for each frequency band so that one of transmission through the first comb filter 161 from the first space 810 to the second space 820 or transmission through the second comb filter 162 from the second space 820 to the first space 810 is made. Therefore, the conversation assisting apparatus 105 can maintain the state of separating the space into two by the isolation object 800 and transmit information by sound without placing a device or a tool in one of the spaces and without making a one-sided speech.

Fifth Embodiment

Figure 15:
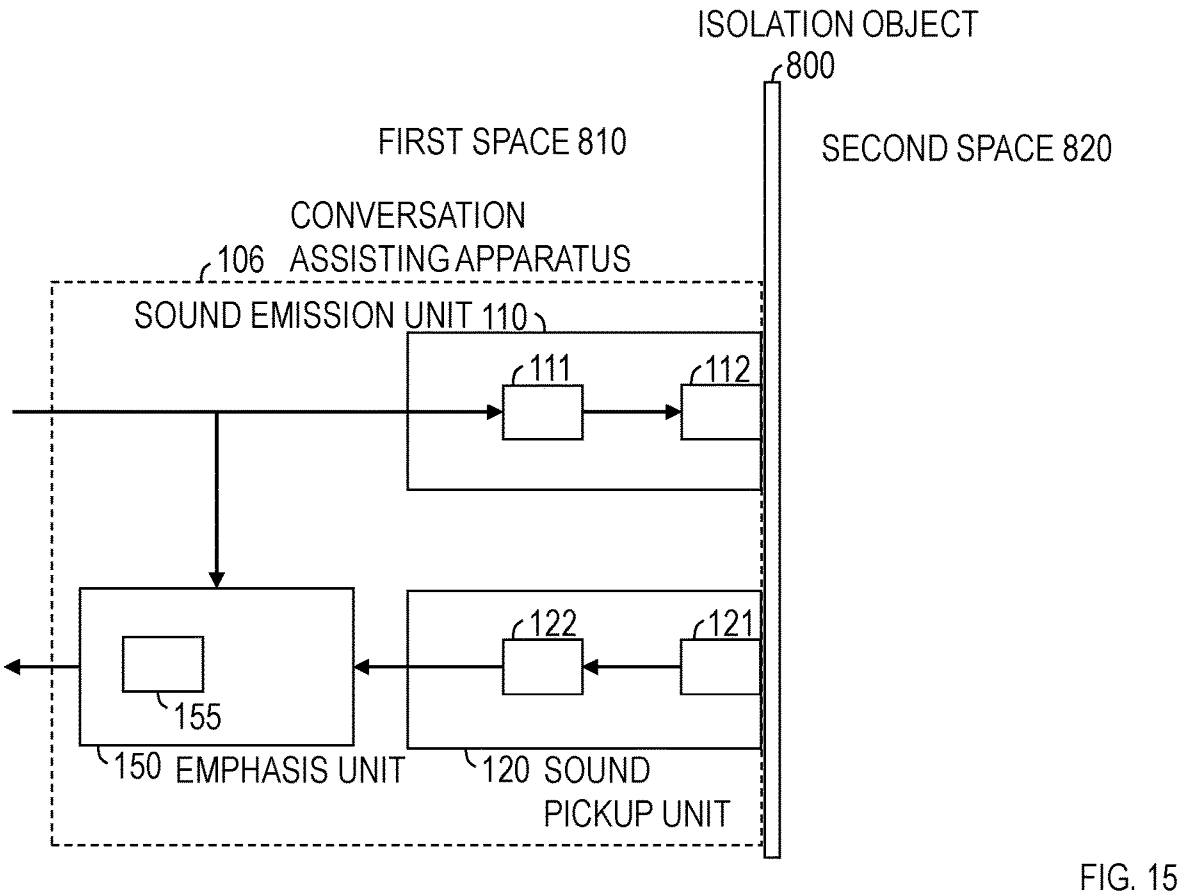
FIG. 15 is a diagram illustrating an example of a functional configuration of a conversation assisting apparatus according to a fifth embodiment.
Figure 16:
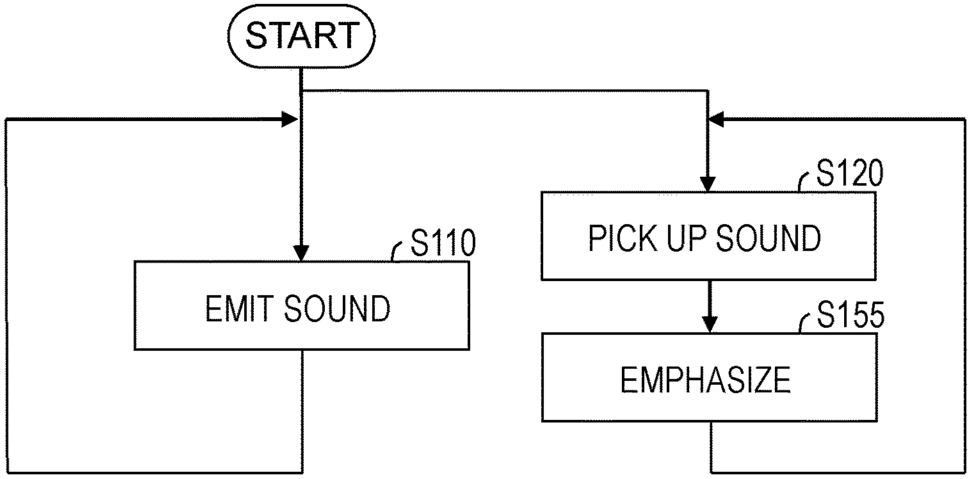
FIG. 16 is a diagram illustrating an example of a processing flow of a conversation assisting method according to the fifth embodiment.

FIG. 15 illustrates an example of a functional configuration of a conversation assisting apparatus according to a fifth embodiment, and FIG. 16 illustrates an example of a processing flow of a conversation assisting method according to the fifth embodiment. A conversation assisting apparatus 106 differs from the conversation assisting apparatus 100 in that the emphasis unit 150 has an echo canceling means 155. The echo canceling means 155 uses a sound to be transmitted to the second space 820, having been input to the conversation assisting apparatus 106, to emphasize a sound except for the sound emitted from the picked-up sound (S155). For echo cancellation, an adaptive filter, a Wiener filter, an echo suppressor, or the like may be used. The conversation assisting apparatus 106 can maintain the state of separating the space into two by the isolation object 800 and transmit information by sound without placing a device or a tool in one of the spaces and without making a one-sided speech.

[Program and Recording Medium]

Figure 17:
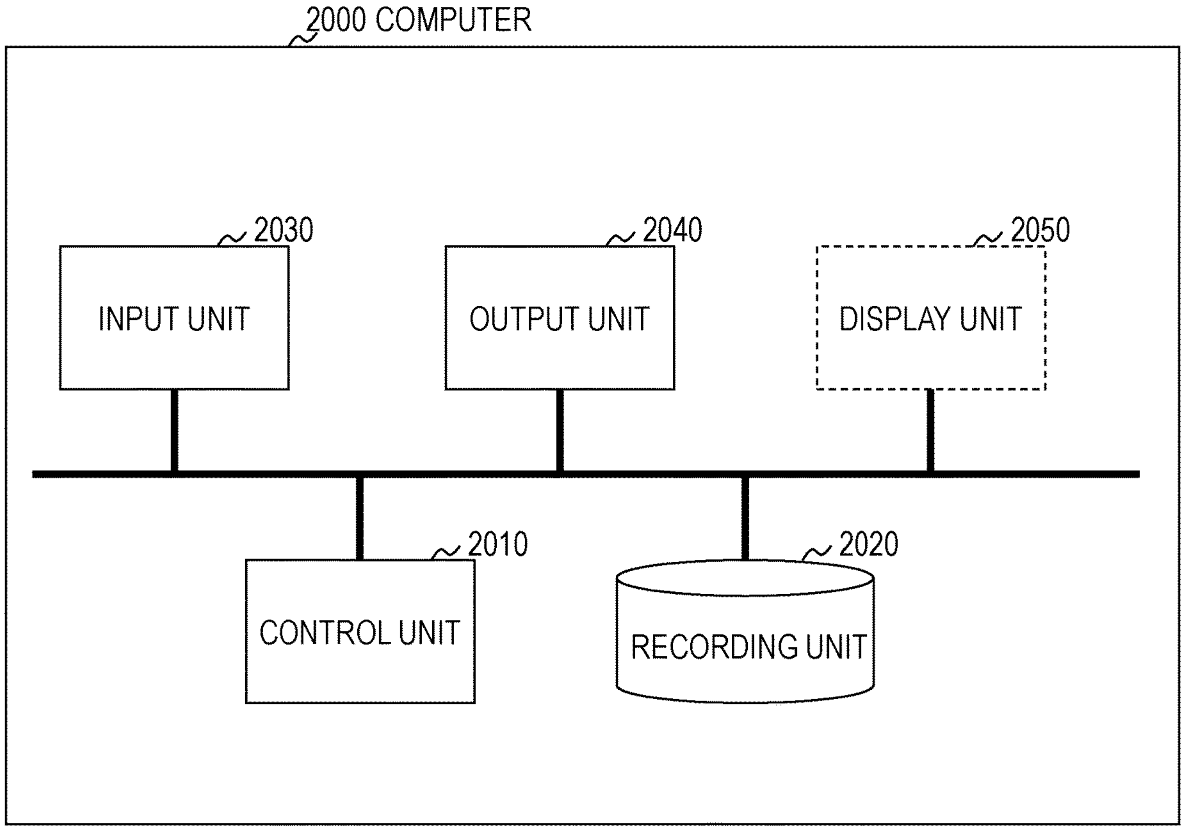
FIG. 17 illustrates an example of a functional configuration of a computer.

The various processing described above can be performed by causing a recording unit 2020 of a computer 2000 illustrated in FIG. 17 to read a program for performing each step of the above method and causing a control unit 2010, an input unit 2030, an output unit 2040, a display unit 2050, and the like to operate. Note that the output means 2040 includes the vibration means 112, and the input unit 2030 includes the pickup means 121. When the doctor uses a headset for conversation, a microphone may be included in the input unit 2030, and a headphone may be included in the output unit 2040.

The program describing the processing content can be recorded on a computer-readable recording medium. The computer-readable recording medium may be, for example, a magnetic recording device, an optical disk, a magneto-optical recording medium, a semiconductor memory, or the like.

The program is distributed by sale, transfer, lending, or the like of a portable recording medium, such as a digital versatile disc (DVD) or a compact disc read-only memory (CD-ROM), on which the program is recorded. Further, the program may be distributed by previously storing the program into a storage device of a server computer and transferring the program from the server computer to another computer via a network.

A computer executing such a program first stores a program recorded on a portable recording medium or a program transferred from the server computer into its own storage device. Then, at the time of performing the processing, the computer reads the program stored in its own recording medium and performs processing in accordance with the read program. As another form for executing the program, the computer may read a program directly from the portable recording medium and perform processing in accordance with the program, or each time the program is transferred from the server computer to the computer, the computer may sequentially perform processing in accordance with the received program. Alternatively, the processing described above may be performed by a so-called application service provider (ASP) type service that does not transfer a program from the server computer to the computer but achieves a processing function only by execution instruction and result acquisition. Note that the program in this form includes information used for processing by an electronic computer and equivalent to a program (such as data that is not a direct command to the computer but has a property to specify the processing of the computer).

In this form, the device has been configured by executing a predetermined program on the computer, but at least a part of the processing content may be achieved in hardware.

REFERENCE SIGNS LIST

100, 101, 102, 103, 104, 105, 106 Conversation assisting apparatus
110 Sound emission unit
111, 122 Amplification means
112 Vibration means
120 Sound pickup unit
121 Pickup means
130, 135 Switch
131 Sensor
136 Blocking unit
140 Utterance detection unit
150 Emphasis unit
151 Blocking means
155 Echo canceling means
161 First comb filter
162 Second comb filter
800 Isolation object
810 First space
820 Second space

The invention claimed is:

1. A conversation assisting apparatus that is placed in a first space in order to transmit an acoustic signal between the first space and a second space, separated by an isolation object, by using the isolation object, the apparatus comprising:
- a switch; and
- a processing circuitry which executes
- a sound emission processing comprising transmitting a sound, to be transmitted to the second space, from the first space side to the isolation object at a predetermined intensity;
- a sound pickup processing comprising picking up a sound transmitted through the isolation object; and
- an emphasis processing comprising emphasizing and outputting a sound from the picked-up sound,
  - wherein, the emphasis processing includes a blocking processing, and
  - when the switch indicates a state of sound transmission from the first space to the second space, the blocking processing comprises blocking the sound output from the emphasis processing.

2. The conversation assisting apparatus according to claim 1,
- wherein the switch is further configured to switch between operations of blocking sound emission from the sound processing and blocking the output of the emphasis processing.

3. A non-transitory computer-readable recording medium storing a computer-executable program instructions that when executed by a processor cause a computer to execute operations of the conversation assisting apparatus according to claim 1.

4. The conversation assisting apparatus according to claim 1, wherein the isolation object is a vehicle, the first space is a space outside the vehicle, and the second space is a space inside the vehicle.

5. A conversation assisting apparatus that is placed in a first space in order to transmit an acoustic signal between the first space and a second space, separated by an isolation object, by using the isolation object, the apparatus comprising:
- a sensor; and a processing circuitry which executes
  - a sound emission processing comprising transmitting a sound, to be transmitted to the second space, from the first space side to the isolation object at a predetermined intensity;
  - a sound pickup processing comprising picking up a sound transmitted through the isolation object; and
  - an emphasis processing comprising emphasizing and outputting a sound from the picked-up sound,
    - wherein, the sensor that detects contact of the sound pickup processing with the isolation object,
    - when the sensor detects no contact, the emphasis processing blocks the sound output from the emphasis processing, and
    - when the sensor detects contact, the emphasis processing outputs the sound in the second space.

6. The conversation assisting apparatus according to claim 5, wherein the isolation object is a vehicle, the first space is a space outside the vehicle, and the second space is a space inside the vehicle.

7. A non-transitory computer-readable recording medium storing a computer-executable program instructions that when executed by a processor cause a computer to execute operations of the conversation assisting apparatus according to claim 5.

8. A conversation assisting apparatus that is placed in a first space in order to transmit an acoustic signal between the first space and a second space, separated by an isolation object, by using the isolation object, the apparatus comprising:
- an utterance detector; and a processing circuitry which executes
  - a sound emission processing comprising transmitting a sound, to be transmitted to the second space, from the first space side to the isolation object at a predetermined intensity;
  - a sound pickup processing comprising picking up a sound transmitted through the isolation object; and
  - an emphasis processing comprising emphasizing and outputting a sound from the picked-up sound,
    - wherein, the emphasis processing includes blocking processing,
    - the utterance detector that detects whether or not a sound to be transmitted to the second space has been input,
    - when the utterance detector detects a sound to be transmitted to the second space, the emphasis processing blocks the sound output from the emphasis processing by the blocking processing, and
    - when the utterance detector detects no sound to be transmitted to the second space, the emphasis processing outputs the sound in the second space without operating the blocking processing.

9. The conversation assisting apparatus according to claim 8, wherein the isolation object is a vehicle, the first space is a space outside the vehicle, and the second space is a space inside the vehicle.

10. A non-transitory computer-readable recording medium storing a computer-executable program instructions that when executed by a processor cause a computer to execute operations of the conversation assisting apparatus according to claim 8.

11. A conversation assisting apparatus that is placed in a first space in order to transmit an acoustic signal between the first space and a second space, separated by an isolation object, by using the isolation object, the apparatus comprising:

a processing circuitry which executes a sound emission processing comprising transmitting a sound, to be transmitted to the second space, from the first space side to the isolation object at a predetermined intensity;

a sound pickup processing comprising picking up a sound transmitted through the isolation object; and an emphasis processing comprising emphasizing and outputting a sound from the picked-up sound, wherein the sound emitted to the isolation object is a sound passing through a first comb filter, the sound emphasized and output is a sound passing through a second comb filter, and a passband of the second comb filter is a stopband of the first comb filter.

12. The conversation assisting apparatus according to claim 11, wherein the isolation object is a vehicle, the first space is a space outside the vehicle, and the second space is a space inside the vehicle.

13. A non-transitory computer-readable recording medium storing a computer-executable program instructions that when executed by a processor cause a computer to execute operations of the conversation assisting apparatus according to claim 11.

14. A conversation assisting apparatus that is placed in a first space in order to transmit an acoustic signal between the first space and a second space, separated by an isolation object, by using the isolation object, the apparatus comprising:

a processing circuitry which executes a sound emission processing comprising transmitting a sound, to be transmitted to the second space, from the first space side to the isolation object at a predetermined intensity;

a sound pickup processing comprising picking up a sound transmitted through the isolation object; and an emphasis processing comprising emphasizing and outputting a sound from the picked-up sound, wherein, the emphasis processing has an echo canceling processing, and the echo canceling processing uses a sound to be transmitted to the second space to emphasize a sound except for the sound emitted from the picked-up sound.

15. The conversation assisting apparatus according to claim 14, wherein the isolation object is a vehicle, the first space is a space outside the vehicle, and the second space is a space inside the vehicle.

16. A non-transitory computer-readable recording medium storing a computer-executable program instructions that when executed by a processor cause a computer to execute operations of the conversation assisting apparatus according to claim 14.

* * * * *